United States Patent
Mukherjee et al.

(10) Patent No.: US 11,109,237 B2
(45) Date of Patent: Aug. 31, 2021

(54) WIRELESS NODES AND METHODS FOR ENABLING COEXISTENCE OF WIRELESS COMMUNICATION SYSTEMS USING LICENSED AND UNLICENSED FREQUENCY BANDS

(71) Applicant: Telefonaktiebolaget LM Ericsson (publ), Stockholm (SE)

(72) Inventors: Amitav Mukherjee, Fremont, CA (US); Reem Karaki, Aachen (DE); Evanny Obregon, Solna (SE); Du Ho Kang, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/325,854

(22) PCT Filed: Aug. 23, 2017

(86) PCT No.: PCT/SE2017/050849
§ 371 (c)(1),
(2) Date: Feb. 15, 2019

(87) PCT Pub. No.: WO2018/044219
PCT Pub. Date: Mar. 8, 2018

(65) Prior Publication Data
US 2019/0191315 A1    Jun. 20, 2019

Related U.S. Application Data

(60) Provisional application No. 62/382,429, filed on Sep. 1, 2016.

(51) Int. Cl.
*H04W 16/14* (2009.01)
*H04W 24/10* (2009.01)
(Continued)

(52) U.S. Cl.
CPC .......... *H04W 16/14* (2013.01); *H04B 7/2615* (2013.01); *H04L 5/0032* (2013.01);
(Continued)

(58) Field of Classification Search
CPC ..... H04L 5/0035; H04L 5/0053; H04W 48/12
See application file for complete search history.

(56) References Cited

U.S. PATENT DOCUMENTS

2009/0016375 A1\* 1/2009 Hsieh .................. H04L 69/03
370/465
2009/0156214 A1\* 6/2009 Lee .................. H04W 36/0085
455/436
(Continued)

FOREIGN PATENT DOCUMENTS

KR    20160055044 A    5/2016
WO    2015187282 A1    12/2015
(Continued)

OTHER PUBLICATIONS

Author Unknown, "Technical Specification Group Radio Access Network; Evolved Universal Terrestrial Radio Access (E-UTRA); Physical channels and modulation (Release 12)," 3GPP TS 36.211, V12.3.0, Sep. 2014, 3GPP Organizational Partners, 124 pages.
(Continued)

*Primary Examiner* — Raj Jain
(74) *Attorney, Agent, or Firm* — Withrow & Terranova, PLLC

(57) ABSTRACT

A first wireless node of a wireless communication system is associated with a first cell having a first cell identity. The first wireless node obtains information relating to a set of wireless nodes which use at least one overlapping communication resource that is also used by at least one second node in the first cell. The first wireless node generates a preamble containing: a first data field designating the first
(Continued)

cell identity, and a second data field reflecting a respective identity of the wireless nodes in the set of wireless nodes which use the at least one overlapping communication resource. The first wireless node transmits a preamble signal containing the preamble, over a predefined set of resources in a shared resource structure of the wireless communication system thus informing about the wireless nodes that use overlapping communication resources.

16 Claims, 3 Drawing Sheets

(51) Int. Cl.
  *H04B 7/26* (2006.01)
  *H04W 72/08* (2009.01)
  *H04L 5/00* (2006.01)
  *H04W 74/08* (2009.01)
(52) U.S. Cl.
  CPC ........... *H04L 5/0035* (2013.01); *H04W 24/10* (2013.01); *H04W 72/085* (2013.01); *H04W 74/0808* (2013.01)

(56) References Cited

U.S. PATENT DOCUMENTS

| | | | |
|---|---|---|---|
| 2012/0039284 A1* | 2/2012 | Barbieri | H04W 48/10 370/329 |
| 2012/0218945 A1* | 8/2012 | Behravan | H04B 7/0613 370/328 |
| 2013/0044700 A1* | 2/2013 | Cheng | H04W 74/004 370/329 |
| 2013/0244651 A1* | 9/2013 | Choi | H04L 27/261 455/435.1 |
| 2013/0315152 A1 | 11/2013 | Ratasuk et al. | |
| 2014/0376483 A1 | 12/2014 | Hong et al. | |
| 2015/0055578 A1* | 2/2015 | Kountouris | H04W 74/0808 370/329 |
| 2015/0249972 A1* | 9/2015 | You | H04L 5/0035 370/254 |
| 2017/0127362 A1* | 5/2017 | Tavildar | H04W 28/0278 |
| 2019/0191315 A1* | 6/2019 | Mukherjee | H04W 72/085 |
| 2020/0281021 A1* | 9/2020 | Zhang | H04L 5/0053 |

FOREIGN PATENT DOCUMENTS

| | | |
|---|---|---|
| WO | 2016021979 A1 | 2/2016 |
| WO | 2016123568 A1 | 8/2016 |

OTHER PUBLICATIONS

Author Unknown, "Technical Specification Group Radio Access Network; Evolved Universal Terrestrial Radio Access (E-UTRA); Multiplexing and channel coding (Release 12)," 3GPP TS 36.212, V12.6.0, Sep. 2015, 3GPP Organizational Partners, 95 pages.

Author Unknown, "Technical Specification Group Radio Access Network; Evolved Universal Terrestrial Radio Access (E-UTRA); Physical layer procedures (Release 12)," 3GPP TS 36.213, V12.3.0, Sep. 2014, 3GPP Organizational Partners, 212 pages.

Author Unknown, "Technical Specification Group Radio Access Network; Evolved Universal Terrestrial Radio Access (E-UTRA); Medium Access Control (MAC) protocol specification (Release 12)," 3GPP TS 36.321, V12.1.0, Mar. 2014, 3GPP Organizational Partners, 57 pages.

Huawei, et al., "R1-150391: Synchronization aspects for LAA secondary carriers," Third Generation Partnership Project (3GPP), TSG RAN WG1 Meeting #80, Feb. 9-13, 2015, 6 pages, Athens, Greece.

Huawei, et al., "R1-151853: Further details on LAA preamble design," Third Generation Partnership Project (3GPP), TSG RAN WG1 Meeting #80bis, Apr. 20-24, 2015, 9 pages, Belgrade, Serbia.

International Search Report and Written Opinion for International Patent Application No. PCT/SE2017/050849, dated Oct. 19, 2017, 15 pages.

Extended European Search Report for European Patent Application No. 17847092.8, dated Mar. 18, 2020, 6 pages.

Examination Report for Indian Patent Application No. 201937008130, dated Jan. 27, 2021, 8 pages.

* cited by examiner

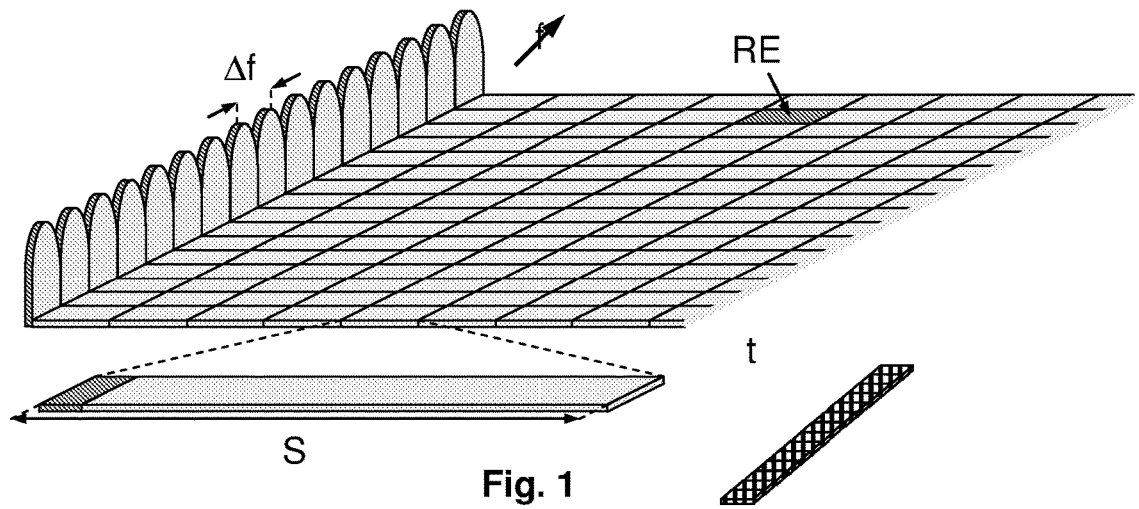
Fig. 1
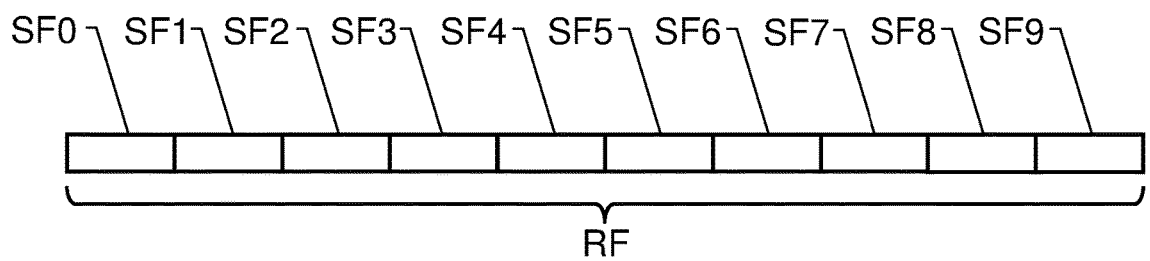
Fig. 2
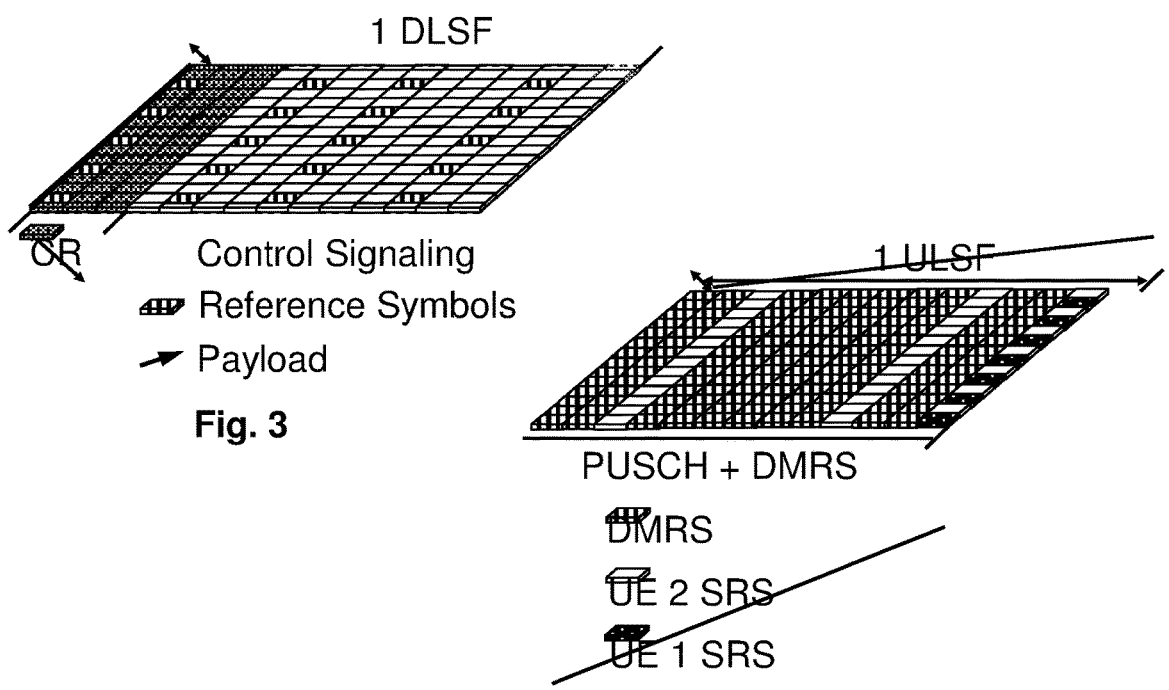
Fig. 3
Fig. 4

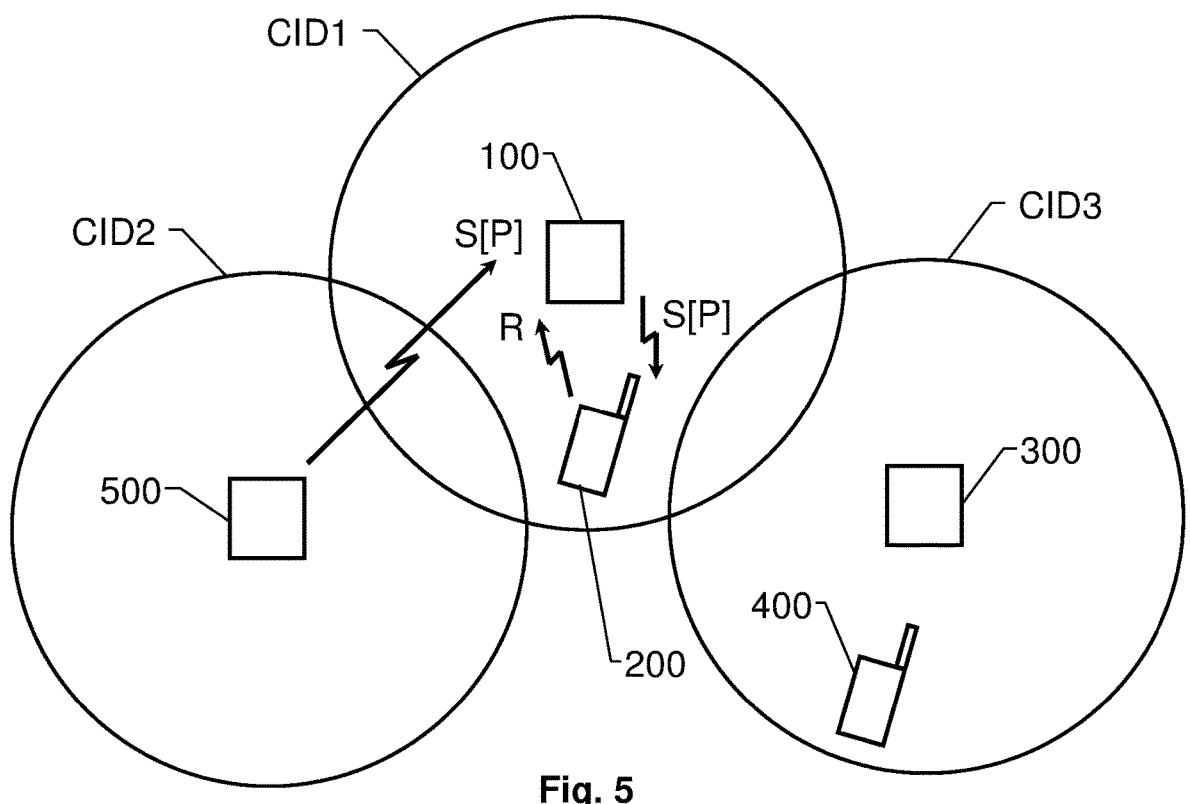
Fig. 5
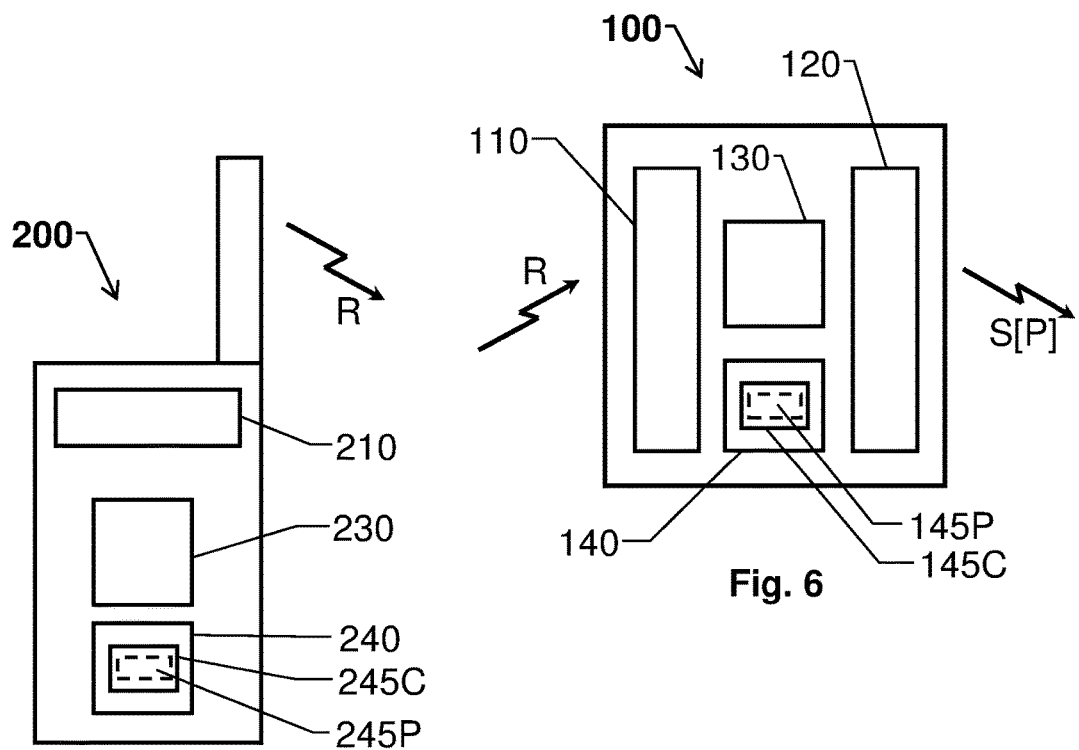
Fig. 7
Fig. 6

WIRELESS NODES AND METHODS FOR ENABLING COEXISTENCE OF WIRELESS COMMUNICATION SYSTEMS USING LICENSED AND UNLICENSED FREQUENCY BANDS

This application is a 35 U.S.C. § 371 national phase filing of International Application No. PCT/SE2017/050849, filed Aug. 23, 2017, which claims the benefit of U.S. Provisional Application No. 62/382,429, filed Sep. 1, 2016, the disclosures of which are incorporated herein by reference in their entireties.

BACKGROUND

The present disclosure relates generally to solutions for improving the performance, quality and power efficiency in a radio communication network that uses both licensed and unlicensed frequency bands. More particularly the proposed solution relates to wireless nodes and corresponding methods as defined below. The disclosure also relates to a computer program and a processor-readable medium.

The 3GPP Rel-13 feature LAA (Licensed-Assisted Access) allows LTE (Long Term Evolution) equipment to also operate in the unlicensed 5 GHz radio spectrum. The unlicensed 5 GHz spectrum is used as a complement to the licensed spectrum. An on-going 3GPP Rel-14 work item has added UL transmissions to LAA. Accordingly, devices connect in the licensed spectrum (primary cell or PCell) and use carrier aggregation to benefit from additional transmission capacity in the unlicensed spectrum, a secondary cell or so-called SCell. Standalone LTE in unlicensed spectrum, MulteFire, is another version of unlicensed spectrum LTE and is currently under development in the MulteFire Alliance Forum.

In unlicensed bands, spectrum is usually opportunistic. Recently, there has been interest in sharing the use Licensed Shared Access with Authorized shared access (ASA). Such systems usually propose a division of rights of use, based on time of use or geographical constraints between mobile operators and an incumbent user. A typical use of this scenario is to enable use of a band that is available for licensed users in some markets, but is being restricted in others because of incumbents such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

In this disclosure the term "interference" is used extensively. Generally, interference should here be understood to mean that one or more communication resources being used by a first node overlap with least one communication resource that is also used by a second node; and that radio energy relating to the communication of the second node reaches the first node in such a manner that the quality of the communication of the first node is degraded in relation to a situation where the second node had not used the least one overlapping communication resource.

An alternative method of spectrum sharing is defined for the Citizen's Broadband Radio Service (CBRS) in the United States within the 3.5 GHz band. The CBRS defines three tiers of sharing, with higher tiers providing higher priority of access to spectrum than the lower ones. In general, multiple tiers of users can be defined, although a pragmatic choice is three tiers. The assignment of channels to different tiers and related configurations are performed by a geolocation database and policy management system known as the Spectrum Access System (SAS). In the CBRS, naval radar in littoral waters, and commercial Fixed Satellite Service (FSS) compose the incumbents. The second tier consists of Priority Access Licenses (PALs), and the third tier comprises opportunistic users known as general authorized access (GAA) users. Incumbent radar activity in the CBRS is dynamic, while FSS (space-to-earth) is static. The SAS is charged with protecting incumbents, and PALs. In addition, the SAS authorizes the authorization of spectrum to GAA users. MulteFire (MF) is a candidate Radio Access Technology (RAT) for certain classes of devices in the 3.5 GHz band, possibly for lower power indoor use. Therefore, the SAS needs to configure different aspects of the channel access and transmission parameters of the MF-based Citizen Broadband Radio Service Devices (CBSDs), i.e., base stations in the form of E-UTRAN Node B, also known as Evolved Node B (eNBs) and their associated user equipments (UEs).

LTE uses OFDM (Orthogonal Frequency Division Modulation) in the downlink and DFT (Discrete Fourier Transform)-spread OFDM (also referred to as single-carrier FDMA (Frequency Division Multiple Access)) in the uplink. The basic LTE downlink physical resource, illustrated in FIG. 1, can thus be seen as a time-frequency grid, where each resource element RE corresponds to one OFDM subcarrier $\Delta f$ during one OFDM symbol interval S. The uplink subframe has the same subcarrier spacing as the downlink and the same number of SC-FDMA symbols in the time domain as OFDM symbols in the downlink.

In the time domain, see FIG. 2, LTE downlink transmissions are organized into radio frames of 10 ms, each radio frame RF consisting of ten equally-sized subframes SF0, SF1, SF2, SF3, SF4, SF5, SF6, SF7, SF8 and SF9 of length $T_{subframe}=1$ ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

FIG. 3 shows an example of a downlink subframe (DLSF). Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. The reference symbols are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. FIG. 4 exemplifies the structure of an uplink subframe (ULSF) in LTE. Here, the uplink resource grid contains data and uplink control information in the physical uplink channel (PUSCH), uplink control information in the physical uplink control channel (PUCCH), and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. Note that UL DMRS and SRS are time-multiplexed into the UL subframe ULSF, and SRS are always transmitted in the last symbol of a normal UL subframe ULSF. The PUSCH DMRS is transmitted once every slot for subframes with normal cyclic prefix, and is located in the fourth and eleventh SC-FDMA symbols.

From LTE Rel-11 onwards, downlink (DL) or uplink (UL) resource assignments can also be scheduled on the enhanced physical downlink control channel (EPDCCH). For Rel-8 to Rel-10 only the physical downlink control channel (PDCCH) is available. Resource grants are UE specific and are indicated by scrambling the downlink control information (DCI) Cyclic Redundancy Check (CRC) with the UE-specific C-RNTI identifier.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may for example support more downlink CCs than uplink CCs, even though the cell is configured with the same number of uplink and downlink CCs.

Up to now, the spectrum used by LTE is dedicated to LTE. This has the advantage that the LTE system does not need to care about the coexistence issue and the spectrum efficiency can be maximized. However, the spectrum allocated to LTE is limited, which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi because Wi-Fi will not transmit once it detects that the channel is occupied.

Furthermore, one way to utilize the unlicensed spectrum reliably is to transmit essential control signals and channels on a licensed carrier. In this document, we denote a secondary cell in unlicensed spectrum as licensed-assisted access secondary cell (LAA SCell). In the case of standalone operation as in MulteFire, no licensed cell is available for uplink control signal transmissions.

In Rel-13 LAA and MF, listen-before-talk (LBT) for DL data transmissions follow a random backoff procedure similar to that of Wi-Fi, with contention window (CW) adjustments based on (hybrid automatic repeat request) HARQ (negative acknowledgement) NACK feedback. Several aspects of UL LBT are under discussion in Release 14. With regard to the framework of UL LBT, the discussion focused on the self-scheduling and crosscarrier scheduling scenarios. UL LBT imposes an additional LBT step for UL transmissions with self-scheduling, since the UL grant itself requires a DL LBT by the eNB. The UL LBT maximum CW size should then be limited to a very low value to overcome this drawback, if random backoff is adopted. Therefore, Release 13 LAA recommended that the UL LBT for self-scheduling should use either a single clear channel assessment (CCA) duration of at least 25 µs (similar to DL DRS), or a random backoff scheme with a defer period of 25 µs including a defer duration of 16 µs followed by one CCA slot, and a maximum contention window size chosen from X={3, 4, 5, 6, 7}. These options are also applicable for cross-carrier scheduling of UL by another unlicensed SCell.

A short UL LBT procedure for the case involving cross-carrier scheduling by a licensed PCell remains open for further study in LAA. The other option supported in MF is a full-fledged random backoff procedure similar to that used by Wi-Fi stations.

Moreover, UL transmissions without LBT when an UL transmission burst follows a DL transmission burst on that respective carrier (with a gap of at most 16 µs between the two bursts) are allowed in Rel-14 LAA and MF.

WO 2015/187282 A1 discloses a solution for shared spectrum access in which multiple tiers of users are allowed to access a set of shared spectrum resources. Second tier users, which receive priority access from the first spectrum tier, transmit reserving signals over the available shared channels during clear channel assessment (CCA) periods associated with the shared channels. Third tier users, which access the shared spectrum at a lower priority than the second tier users, attempt to synchronize timing with second tier users when second tier user presence is detected. Third tier users will be blocked from transmission on the shared channels when the third tier users detect the reserving signals. Second tier users, thus, transmit on the shared channels with a lower likelihood of interference from third tier users, and third tier users will be able to transmit on any of the shared channels when the third tier user detects a clear CCA.

In the MulteFire Alliance Forum, it has been further discussed that the SAS may coordinate LBT parameters and discovery reference signal transmission parameters across MF eNBs that share channels.

The existing coexistence methods that use energy-detection (ED) based LBT do not work well in scenarios with asymmetric transmit powers. This is because the higher-power nodes cause a disproportionate level of silencing of adjacent nodes. This, in turn, reduces the spatial reuse and degrades both DL and UL network throughput.

LTE has some existing enhanced inter-cell interference coordination (eICIC) techniques to mitigate interference between highpower macro cells and lower-power pico cells, such as almost blank subframes (ABS) and cell range expansion (CRE). ABS is semi-statically configured and cannot adapt dynamically to traffic variations. CRE is designed for enhancing cell association and mobility management for lower-power cells, and not for balancing channel access or interference mitigation to data transmissions.

SUMMARY

The object of the present disclosure is therefore to offer a solution which solves, or at least mitigates the above problems.

According to a first aspect, the object is achieved by a method performed in a first wireless node of a wireless communication system. The first wireless node is associated with a first cell having a first cell identity. The proposed method comprises obtaining information relating to a set of wireless nodes, which use at least one overlapping communication resource that is also used by at least one second node in the first cell. The method further comprises generating a preamble containing first and second data fields. The first data field designates the first cell identity. The second data field reflects a respective identity of the wireless nodes in the set of wireless nodes which use the at least one overlapping communication resource. Additionally, the method comprises transmitting a preamble signal containing the preamble over a predefined set of resources in a shared resource structure of the wireless communication system.

According to a second aspect, the object is achieved by a method performed in a second wireless node of the wireless communication system. The second wireless node is associated with a first cell having a first cell identity. The proposed method comprises measuring wireless signals from at least one other wireless node, which is associated with a cell different from the first cell. The method further comprises generating a report identifying at least one node of the at least one other wireless node as a member of a set of wireless nodes, which use an overlapping communication resource that is also used in the first cell. Moreover, the method comprises transmitting a report signal over a predefined set of resources in a shared resource structure of the wireless communication system. The report signal contains said report.

The first and second methods are advantageous because they reduce the risk of inter-cell interference considerably. At the same time, good spatial reuse is attainable as well as a high throughput in the wireless communication system. Consequently, robust coexistence of multiple MF cells with asymmetric transmit powers on a shared channel is possible. Furthermore, an SAS can efficiently coordinate MF-based GAA networks.

According to other aspects, the object is achieved by first and second wireless nodes in the wireless communication system, which operate in agreement with the first and second methods respectively. The advantages of these nodes, as well as the preferred embodiments thereof, are apparent from the discussion above with reference to the proposed wireless nodes.

According to a further aspect, the object is achieved by a computer program loadable into the memory of at least one processor, and includes software adapted to implement the method proposed above when said program is run on at least one processor.

According to yet another aspect, the object is achieved by a processor-readable medium, having a program recorded thereon, where the program is to control at least one processor to perform the method proposed above when the program is loaded into the at least one processor.

Further advantages, beneficial features and applications of the proposed solution will be apparent from the following description and the dependent claims.

BRIEF DESCRIPTION OF THE DRAWINGS

The proposed solution is now to be explained more closely by means of preferred embodiments, which are disclosed as examples, and with reference to the attached drawings.

FIG. 1 illustrates the LTE downlink physical resource;

FIG. 2 illustrates the LTE time-domain structure;

FIG. 3 exemplifies the structure of a downlink subframe in LTE;

FIG. 4 exemplifies the structure of an uplink subframe in LTE;

FIG. 5 shows a system overview illustrating the wireless nodes of the proposed solution;

FIG. 6 shows a block diagram over a first wireless node according to one embodiment;

FIG. 7 shows a block diagram over a second wireless node according to one embodiment;

DETAILED DESCRIPTION

Figure 8:
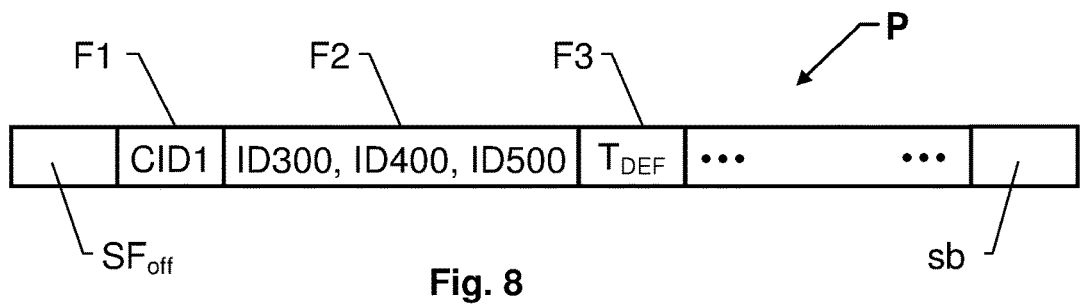
FIG. 8 illustrates the structure of a preamble according to one embodiment.

The present disclosure proposes a solution for preamble-based coexistence in MF in order to improve performance over an ED-based LBT approach.

Referring to FIGS. 5 and 6, we see a first wireless node 100 in a wireless communication system. The first wireless node 100 is associated with a first cell having a first cell identity CID1. This means that the first wireless node 100 is configured to serve wireless devices that are located within the first cell. Consequently, the first cell represents a physical area in proximity to the first wireless node 100, e.g. an area surrounding the first wireless node 100. However, other cell configurations are equally well conceivable, such as sector shaped cells, where one or more antennas are arranged to cover a widening area extending from the first wireless node 100. In any case, the first wireless node 100 has first and second interfaces 110 and 120 respectively and a first processing unit 130.

The first interface 110 is configured to obtain information relating to a set of wireless nodes 300, 400 and 500 respectively, which use at least one overlapping communication resource that is also used by a second node 200 in the first cell. In the context, "the use of a communication resource" is understood to mean employ a particular resource element or resource block for transmitting data from one wireless node to another.

For example, the first interface 110 may obtain the information about the set of such potentially interfering wireless nodes 300, 400 and 500 by receiving a report signal R from a second wireless node 200 in the wireless communication system. The report signal R, in turn, may be a radio signal that is transmitted over a predefined set of resources in a shared resource structure of the wireless communication system.

The first processing unit 130 may be configured to decode the report signal R to derive the at least one wireless node as being a member of the set of wireless nodes 300, 400 and 500 which use the overlapping communication resource in the first cell.

In the first wireless node 100, the first processing unit 130 is configured to generate a preamble P containing a first data field F1 designating the first cell identity CID1, see FIG. 8. The preamble P, which is preferably located at a start of a first downlink frame in a new transmission opportunity for the first wireless node 100, also contains a second data field F2 reflecting a respective identity ID300, ID400 and ID500 of the wireless nodes 300, 400 and 500 in the set of wireless nodes which use the at least one overlapping communication resource. In other words, the second data field F2 contains pieces of information that for each of the wireless nodes 300, 400 and 500 uniquely designate the identity ID300, ID400 and ID500 of the wireless nodes 300, 400 and 500 respectively in the wireless communication system. Thus, the second data field F2 constitutes a basis for identifying potentially interfering wireless nodes.

The second interface 120 is configured to transmit a preamble signal S[P] containing the preamble P. The preamble signal S[P] is transmitted over a predefined set of resources in a shared resource structure of the wireless communication system, for example operating according to MulteFire.

The first processing unit 130 is further configured to check if a preamble signal S[P] has been received from at least one other wireless node, say 500, via the predefined set of resources. If so, the first processing unit 130 is configured to decode the preamble signal S[P] to obtain a decoded preamble P. Then, the first processing unit 130 is configured to check if the first cell identity CID1, i.e. its own ID, is included in the decoded preamble P. If so, the first processing unit is configured to refrain from causing the first wireless node 100 to transmit on at least one shared resource in the shared resource structure of the wireless communication system during a defined period of time $T_{DEF}$. Thereby, the risk of interference is reduced.

According to one embodiment, the preamble P also contains a third data field. The third data filed describes the defined period of time $T_{DEF}$ during which first wireless node 100 refrains from transmitting on the at least one shared resource in the shared resource structure of the wireless communication system. In the embodiment, the first processing unit 130 is further configured to derive the defined period of time $T_{DEF}$ from the decoded preamble P.

According to another embodiment, the first processing unit 130 is configured to obtain the information relating to a set of wireless nodes 300, 400 and 500, which use the overlapping communication resource in the first cell by: (a) receiving a report signal R from a second wireless node 200 in the wireless communication system; and (b) decoding the report signal R to derive at least one wireless node as being a member of the set of wireless nodes 300, 400 and 500, which use the overlapping communication resource in the first cell.

Preferably, the first processing unit 130 is further configured to introduce at least one measurement block in the shared resource structure of the wireless communication system of the first cell. In the measurement block, the first wireless node 100 refrains from transmitting signals during the measurement block. Thus, during one or more intervals corresponding to the at least one measurement block it is rendered easier for the second wireless node 200 to measure any signals from the wireless nodes 300, 400 and 500 respectively.

Further preferably, the first processing unit 130 is configured synchronize the at least one measurement block with an interval provided in the shared resource structure in the at least one neighbor cell to the first cell, i.e. in FIG. 5, the cells having second and third cell identities CID2 and CID3 respectively. During said interval, wireless nodes 300 and 500 respectively (e.g. eNBs) in the neighbor cells transmit a respective reference signal configured to form a basis for measurements underlying the report signal R.

Referring now to FIG. 7, it is presumed that the second wireless node 200 is associated with the first cell having the first cell identity CID1. In other words, the second wireless node 200 is served by the first wireless node 100. Hence, the first wireless node 100 may be a base station in the form of an eNB.

The second wireless node 200 contains a second processing unit 230 and a second interface 210. The second processing unit 230 is configured to measure wireless signals from at least one other wireless node, in FIG. 5 nodes 300, 400 and 500, which are associated with cells different from the first cell, namely CID3 and CID2. For example, the wireless node 300 may be a first other base station (e.g. an eNB); the wireless node 400 may another wireless device (e.g. a UE) that is served by said wireless node 300; and the wireless node 500 may be second other base station (e.g. an eNB).

Additionally, the second processing unit 230 is configured to generate a report identifying at least one node of the at least one other wireless node 300, 400 and 500 as a member of a set of wireless nodes, which use the overlapping communication resource in the first cell.

An output interface 210 in the second wireless node 200 is configured to transmit a report signal R over a predefined set of resources in a shared resource structure of the wireless communication system, preferably at least to the first wireless node 100, where the report signal R contains said report. Thus, the report signal R may form a basis for the preamble P.

According to one embodiment, the second processing unit 230 is configured to perform the measuring of the wireless signals from the wireless node 300, 400 and/or 500 by: (i) measuring a power level of a received reference signal and/or (ii) measuring a parameter reflecting a quality a received reference signal. The parameter reflecting the quality of the received reference signal thus carries information about a quality of the wireless signal. The quality, in turn, may for example quantify an absolute amount in relation to a predefined standard, and/or indicate a relative figure or quota among the signals received. In addition thereto, or as another alternative, the second processing unit 230 may be configured to perform the measuring of the wireless signals from the wireless node 300, 400 and/or 500 by: (iii) measuring a signal strength indicated via an average total of received power observed in a predefined set of reference symbols.

In further detail, it is noted that the embodiments of the proposed solution are applicable to MF, LAA, 3GPP New Radio (NR), or other LTE versions based on TDD or Enhanced Interference Mitigation & Traffic Adaptation (eIMTA) when deployed in a general ASA system, and possibly coordinated by one or more ASA controllers (e.g., SAS). The parameter configurations performed by a SAS are generally on a longer time scale compared to the actual transmission time intervals of MF, and transmissions may be conditioned on successful LBT. The channel selections and related parameter configurations may be sent directly from the SAS to one or more MF eNBs over a logical interface, or may be sent to an intermediary logical controller or domain proxy that is connected with one or more MF eNBs.

According to embodiments of the proposed solution, the preamble signal S[P] may be encoded and modulated as follows. In order for adjacent nodes to quickly receive and decode the preamble P, the preamble P should be located at the start of the first DL subframe DLSF in a new transmission opportunity (TXOP).

There are two possibilities for the resource allocation of the preamble signal S[P] within the control region CR of a DL subframe DLSF; namely in the physical hybrid-ARQ indicator channel (PHICH) resources or in the physical downlink control channel (PDCCH) resources.

The PHICH resources are currently unused in frame structure 3 DL subframes (LAA and MF) since the UL HARQ mechanism is asynchronous.

The number of PHICH groups for normal cyclic prefix is given in the existing LTE specs by $$N_{PHICH}^{group} = [N_g(N_{RB}^{DL}/8)]$$

where $N_g \in \{1/6, 1/2, 1, 2\}$ is given by the higher layer. As an example, if $N_g=1/6$ is fixed for a 20 MHz MF cell, then 3 PHICH groups spanning a total of 36 REs across the system bandwidth would be available. Legacy PHICH adopts length-3 repetition coding for each ACK/NACK bit, followed by code spreading with an orthogonal sequence (spreading factor 4 for normal CP). Eight orthogonal sequences are available per PHICH group. Therefore, between one to eight information bits can be sent per PHICH group.

The PDCCH resources currently span between one and three OFDM symbols at the start of a DL slot for frame structure 3. As an example, the encoding and modulation structure for the MF preamble P can be based on that of the legacy PDCCH. A specific region of the PDCCH is pre-defined and pre-allocated for MF preamble transmission. All neighbor cells will check the same PDCCH search space for the preamble P.

Alternatively, the preamble P is also included in UL transmissions. For example, this would be useful for a TXOP that starts with a burst of UL subframes ULSF or has all UL subframes ULSF. In another example, the preamble P is transmitted in UL transmissions that were not explicitly scheduled by the eNB, i.e., autonomous UL bursts.

If the preamble P is included in a UL subframe ULSF that spans one or more UL interlaces, a candidate resource location would be the first n SC-FDMA symbols of the first UL subframe ULSF or slot at the start of an UL burst. As a non-limiting example, the encoding and modulation can be based on existing methods utilized on MF-sPUCCH (short PUCCH) for transmission of UCI, which make use of tail-biting convolutional codes followed by appendage of CRC bits.

If the MF cell is operating with multiple DL CCs using CA and the PCell is always included in each DL transmission, then the preamble may be transmitted only on the PCell. If the multi-carrier transmissions allow the absence of the PCell, then the preamble may be transmitted on any SCell.

As mentioned above, the parameters signaled in the preamble P include the own cell identity CID1 (i.e. associated with the first wireless node 100) and a respective identity of the wireless nodes which use the at least one overlapping communication resource (i.e. the potential interferers represented by the wireless nodes 300, 400 and 500). Preferably, the preamble P also includes a defined period of time during which the first wireless node shall refrain from transmitting on at least one shared resource in the shared resource structure of the wireless communication system (in other words a subframe offset until end of one or more TXOPs).

Consequently, the below table 1 shows a possible generic outline of the information signaled in the preamble P.

TABLE 1

| Parameter | # of bits |
|---|---|
| Subframe offset until end of one or more TXOPs | 4+ |
| Own cell ID | 9 |
| N neighbour cell IDs that are causing interference | 9N |
| Spare bits | M |
| Total | ≥9(N + 1) + M + 4 |

Four bits are proposed to be allocated for the signaling of the subframe offset until the end of the current TXOP, since up to 10 ms maximum channel occupancy time (MCOT) is currently allowed in the EN BRAN harmonized standard. For NR-based systems where a single TTI may occupy a fraction of 1 ms, e.g., 0.25 ms or 0.2 ms, either additional bits are needed to signal the number of upcoming subframes, or the TXOP duration time (in ms) can be signaled directly.

The physical cell ID (PCI) of the node initiating a TXOP is included so that UEs that wish to initiate an autonomous UL transmission do not necessarily back off to their own serving cell. This cell ID is also beneficial for adjacent eNBs to discover interference victims and initiate interference mitigation methods. If a UE is sending the preamble, it can indicate the cell ID of its serving cell. In another aspect, the preamble may transmit the cell global identifier (CGI) using 28 bits, instead of the physical cell ID. In another aspect, the neutral host network (NHN) ID or participating service provider (PSP) ID may be transmitted instead of the PCI.

The preamble includes the PCI of N strongest neighboring interfering cells, where N≥0. The selection of such interferer cells may be based on metrics such as SINR, INR, RSRP, RSSI, or RSRQ relative to a threshold at one or more served UEs or at the eNB receiver.

As another non-limiting example, for a certain TXOP, an eNB can attempt to defer strongest neighboring interfering cells to M UEs that are transmitting/receiving within the TXOP in which the preamble is sent. The N strongest neighbors are selected based on one or more of the metrics (e.g. SINR, RSRP, RSRQ and/or INR) considering measurement from the M UEs only. This minimizes the unnecessary blockage of eNBs with less interference impact on the upcoming transmission in the TXOP in which the preamble is sent.

A number of spare bits are proposed to be included for future enhancements. Additional optional fields may also be transmitted using the spare bits, for example:

the DL-to-UL transition point within the current TXOP,
channel access parameters currently used, such as the
contention window (CW), HARQ NACK-to-ACK ratios of recent transmissions, The location and occurrence of critical periodic transmissions such as DRS and RACH, Channel access mechanism mode for uplink transmissions, such scheduled or autonomous. Additionally, the time duration or transition point can be included.

Upon successful decoding of a preamble P sent by an adjacent node, receiving nodes that identify their cell ID in the list of interferers may be required to defer their transmissions by a certain period of time. Examples for this period are until the end of the TXOP specified in the received preamble, or one or more MCOTs. As a non-limiting example, the deferral period can be adjusted based on the load conditions, type of traffic to be served, previous performance or uplink channel access mechanism mode in the interferer cells. The receiving nodes that identify their cell ID can also reduce transmit power, or increase ED threshold, or change the operating frequency channel etc. in order to mitigate interference to the preamble transmitter. These adjustments can be together with deferring.

Apart from Reference Signal Received Power (RSRP) and Reference Signal Received Quality (RSRQ), LAA already supports feedback of RSSI from UEs to their serving cell. To support the determination of strong interferers, the eNB may configure measurement periods or gaps where UEs measure strongest interferers and their corresponding PCIs. These measurement periods may be chosen to coincide with the DRS occasions of adjacent cells, if known to the eNB. Additional feedback mechanisms and signaling may be introduced to convey such reports from UEs to their serving cell. As a non-limiting example, the determination of strong interferers can be based on the measurements provided by all served UEs or only the one or more UEs with worst performance in terms of data rate, SINR, etc.

Figure 9:
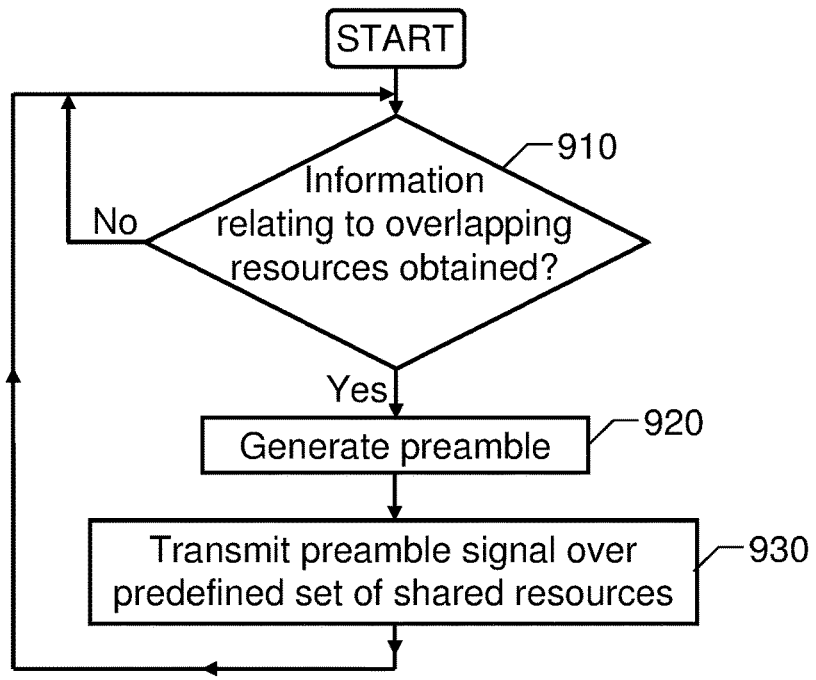
FIG. 9 illustrates, by means of a first flow diagram, a first general method according to the proposed solution.
Figure 10:
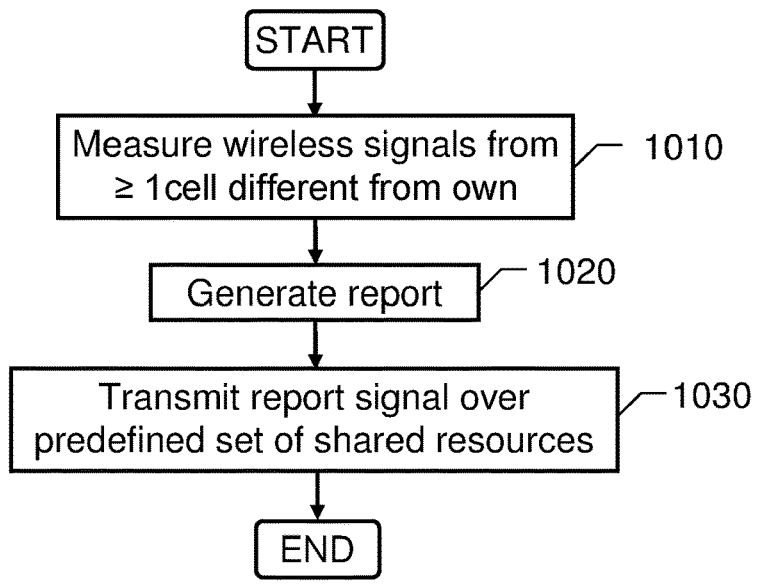
FIG. 10 illustrates, by means of a second flow diagram, a second general method according to the proposed solution.

In order to sum up, and with reference to the flow diagrams in FIGS. 9 and 10, we will now describe how the proposed solution may be executed in the first wireless node and the second wireless node respectively.

In a first step 910 of FIG. 9, it is checked if information has been obtained, which information relates to a set of wireless nodes using at least one overlapping communication resource that is also used by at least one node in the own cell, i.e. the first cell. If such information has been obtained, the procedure continues to a step 920; and otherwise, the procedure loops back and stays in step 910.

In step 920, a preamble is generated, which contains a first data field designating an identity of the own cell, i.e. the first cell; and a second data field reflecting a respective identity of the wireless nodes set of wireless nodes using at least one overlapping communication resource. As explained above, the second data field may contain pieces of information that, for each of a number of wireless nodes, uniquely designate a respective identity of said nodes. Consequently, generating the preamble involves putting together information about the own cell identity and the identities of potentially interfering wireless nodes; and assembling this information into a standardized format.

Then, in a step 930, a preamble signal containing the preamble is transmitted over a predefined set of resources in the shared resource structure of the wireless communication system. Subsequently, the procedure loops back to step 910.

In FIG. 10, in a first step 1010, wireless signals are measured, which originate from at least one other wireless node that is associated with a cell different from the own cell, i.e. not the first cell. After that, in a step 1020, a report is generated, which report identifies at least one node of the at least one other node as a member of a set of wireless nodes which use an overlapping communication resource that is also used in the own cell, i.e. the first cell. Thus, analogous to the above, generating the report involves putting together information about the identities of the potentially interfering wireless nodes; and assembling this information into a standardized format.

Thereafter, in a step, 1030, a report signal is transmitted over a predefined set of resources in a shared resource structure of the wireless communication system, which report signal contains said report. Then, the procedure ends.

Especially, the processing units 130 and 230 of the present wireless nodes 100 and 200 respectively may comprise one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Moreover, although the embodiments of the proposed solution has described above with reference to the drawings comprise processor and processes performed in at least one processor, the solution thus also extends to computer programs, particularly computer programs on or in a carrier, adapted for practical implementation. The program may be in the form of source code, object code, a code intermediate source and object code such as in partially compiled form, or in any other form suitable for implementation. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention claimed is:

1. A method performed in a base station of a wireless communication system, the base station being associated with a first cell having a first cell identity, and the method comprising:

obtaining information relating to a set of wireless nodes which use at least one overlapping communication resource that is also used by at least one second node in the first cell;

generating a preamble based on the obtained information containing:

a first data field designating the first cell identity, and
a second data field reflecting a respective identity of the wireless nodes in the set of wireless nodes which use the at least one overlapping communication resource; and transmitting a preamble signal containing the preamble, the preamble signal being transmitted over a predefined set of resources in a shared resource structure of the wireless communication system.

2. The method according to claim 1, further comprising:
checking if a preamble signal has been received from at least one other wireless node via the predefined set of resources; and if so
decoding the preamble signal to obtain a decoded preamble;
checking if the first cell identity is included in the decoded preamble; and if so
refraining from transmitting on at least one shared resource in the shared resource structure of the wireless communication system during a defined period of time.

3. The method according to claim 2, wherein the preamble further contains a third data field describing said defined period of time, and the method further comprises:
deriving said defined period of time from the decoded preamble.

4. The method according to claim 1, wherein the preamble is located at a start of a first downlink frame in a new transmission opportunity for the base station.

5. The method according to claim 1, wherein the obtaining of information relating to a set of wireless nodes which use the overlapping communication resource in the first cell involves:
receiving a report signal from a second wireless node in the wireless communication system; and
decoding the report signal to derive at least one wireless node as being a member of the set of wireless nodes which use the overlapping communication resource in the first cell.

6. The method according to claim 1, wherein the second wireless node is served by the base station.

7. The method according to claim 5, wherein the report signal is based on measurements performed in the second wireless node.

8. The method according to claim 1, further comprising:
introducing at least one measurement block in the shared resource structure of the wireless communication system of the first cell, in which measurement block the base station refrains from transmitting signals.

9. The method according to claim 8, wherein the at least one measurement block is synchronized with an interval provided in the shared resource structure in the at least one neighbor cell to the first cell, during which interval a wireless node in the at least one neighbor cell transmits a reference signal configured to form a basis for measurements underlying the report signal.

10. A base station in a wireless communication system, the base station being associated with a first cell having a first cell identity, and comprising:
a first interface configured to obtain information relating to a set of wireless nodes which use at least one overlapping communication resource that is also used by at least one second node in the first cell;
a first processing unit configured to generate a preamble based on the obtained information containing:
a first data field designating the first cell identity, and
a second data field reflecting a respective identity of the wireless nodes in the set of wireless nodes which use the at least one overlapping communication resource; and
a second interface configured to transmit a preamble signal containing the preamble, the preamble signal being transmitted over a predefined set of resources in a shared resource structure of the wireless communication system.

11. The base station according to claim 10, wherein the first processing unit is further configured to:
check if a preamble signal has been received from at least one other wireless node via the predefined set of resources; and if so
decode the preamble signal to obtain a decoded preamble;
check if the first cell identity is included in the decoded preamble; and if so
refrain from causing the base station to transmit on at least one shared resource in the shared resource structure of the wireless communication system during a defined period of time.

12. The base station according to claim 11, wherein the preamble further contains a third data field describing said defined period of time, and the first processing unit is further configured to:
derive said defined period of time from the decoded preamble.

13. The base station according to claim 10, wherein the preamble is located at a start of a first downlink frame in a new transmission opportunity for the base station.

14. The base station according to claim 10, wherein the first processing unit is configured to obtain the information relating to a set of wireless nodes which use the overlapping communication resource in the first cell by:
receiving a report signal from a second wireless node in the wireless communication system; and
decoding the report signal to derive at least one wireless node as being a member of the set of wireless nodes which use the overlapping communication resource in the first cell.

15. The base station according to claim 11, wherein the first processing unit is further configured to:
introduce at least one measurement block in the shared resource structure of the wireless communication system of the first cell, in which measurement block the base station refrains from transmitting signals.

16. The base station according to claim 12, wherein the first processing unit is configured synchronize the at least one measurement block with an interval provided in the shared resource structure in the at least one neighbor cell to the first cell, during which interval a wireless node in the at least one neighbor cell transmits a reference signal configured to form a basis for measurements underlying the report signal.

* * * * *